Figure 1:
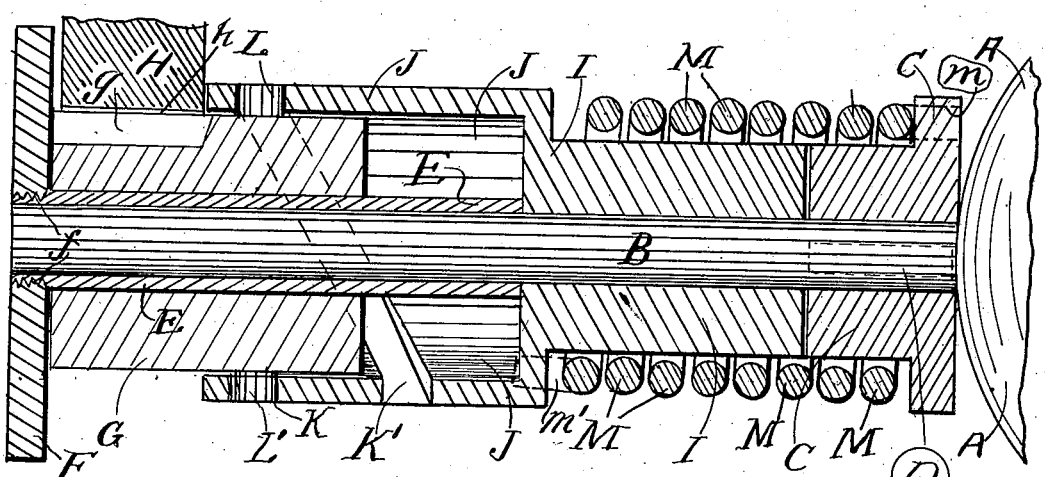

O. BRISBOIS.
ELECTRIC STARTER.
APPLICATION FILED JULY 25, 1921.

1,426,274.

Patented Aug. 15, 1922.

Witness:
Bess S. Brown

Odilon Brisbois,
Inventor,
By Charles Turner Brown,
Atty.

UNITED STATES PATENT OFFICE.

ODILON BRISBOIS, OF GARY, INDIANA.

ELECTRIC STARTER.

1,426,274.  Specification of Letters Patent.  Patented Aug. 15, 1922.

Application filed July 25, 1921. Serial No. 487,306.

*To all whom it may concern:*

Be it known that I, ODILON BRISBOIS, a citizen of the United States, and a resident of Gary, in the county of Lake and State of Indiana, have invented certain new and useful Improvements in Electric Starters, of which the following, when taken in connection with the drawing accompanying and forming a part thereof, is a specification.

This invention relates to mechanism installed between an electrical motor and a rotatable member of an internal combustion engine, to transmit rotation of the motor shaft to a rotatable member of the engine, and to be actuated, in turn, by said rotatable member to disengage it from said rotatable member.

Among the objects of the invention is to obtain a device of the kind named which is simple in construction, economically made, easily applied, durable, not readily broken, and reliable in operation.

Figure 2:
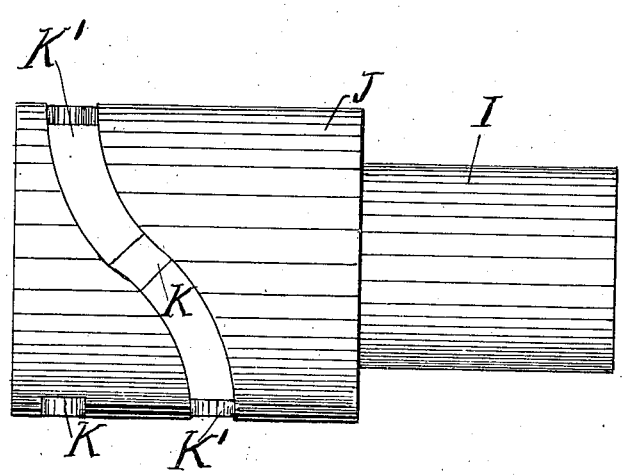

In the drawing referred to Fig. 1 is a longitudinal section of an apparatus embodying the invention; and Fig. 2 is a side elevation of a driving element thereof.

A reference character applied to designate a given part indicates said part throughout the several figures of the drawing, wherever the same appears.

A represents a portion of the housing of an electric motor, and B the shaft thereof. C represents a hub which is mounted on shaft B, and secured thereto to rotate therewith by key or feather D. E represents a sleeve which is non-rotatably mounted on shaft B. F represents a stationary plate to which the sleeve E is secured, as by screw threads $f, f$. G represents a gear pinion member which is loosely mounted on sleeve E, and movable longitudinally and rotatably thereon. $g$ represents a tooth on pinion member G, and H represents a portion of a gear, provided with gear teeth, (as $h$ ), which may be mounted on any desired rotatable member of an internal combustion engine, usually the fly wheel. Pinion G is illustrated in Fig. 1 with the teeth $g$ thereof in mesh with teeth $h$ of gear H. I represents a hub which is loosely mounted on shaft B, and J represents a cylindrical member which is joined to hub A, said hub and cylindrical member forming one element. K, K' represents spirally extending slots in cylindrical member J. L, L' represent abutments on pinion member G which extend into slots K, K', respectively. M represents a coiled spring, one end whereof is secured to hub C, as by being bent and extending into an aperture therefor in said hub, as at $m$, Fig. 1, and the other end secured to the hub and cylindrical member I, J, as at $m'$ in said figure. Said spring constitutes a yielding connection between the hub C and member I, J. It will be observed that the hub C and member I, as illustrated in Fig. 1, shows the rear half of said members, and that hub I and cylindrical member J as illustrated in Fig. 2, shows the forward or front half in elevation, and that the spirals K, K', are extended spirally in one direction in said Fig. 1, and in the opposite direction in Fig. 2. The direction of the spirals correspond with and is controlled by the direction of rotation of the motor shaft B, said direction of rotation being such that when said shaft is operated and the hub and cylindrical member I, J, are rotated, the pinion member G will be, primarily, moved longitudinally on sleeve E, (by means of abutments L, L' in slots K, K'), into mesh with teeth $h$ of gear H, and subsequent to said engagement continued rotation of the motor shaft will rotate said pinion member, said abutments being at such time at the ends of the spirals K, K'. The direction of the rotation of motor shaft B is thus controlled by the direction of rotation of the engine when in operation.

When the engine is started gear H turns pinion member G, and when the circuit in which motor A is an element is broken, and the rotation of shaft B becomes less than the rotation of pinion member G, said pinion member is retracted by pins L, L', in slots K, K', and moved longitudinally on sleeve F, out of engagement with gear teeth $h$.

The operation of the apparatus is as follows; when shaft B is rotated by motor A the pinion member G is moved longitudinally on sleeve E out from the cylindrical member J and teeth $g$ of said pinion member meshed with teeth $h$ of gear H. Continued rotation of said shaft puts spring M under tension and rotates pinion member G thus rotating gear H and the rotatory member of the engine on which it is mounted. When the engine is thus started and turns by its own energy and gear H is turned to turn pinion member G faster than it is turned by motor A, said gear H forces said pinion member longitudinally on sleeve E, from the position in which it is illustrated in Fig. 1, back into the chamber of cylindrical member J, with teeth *g* out of engagement with teeth *h*.

I construct the spring M with its inside diameter greater than the outside periphery of hubs C and I; hence when said spring is put under tension, as last above recited, the ends thereof, as well as the body part, are subject to a pulling strain only, and said spring cannot, therefore, be "set" as it is termed. Spring M, therefore, forms the yielding connection between the shaft B and the gear pinion member G.

I claim;

1. In an electric car starter, a rotatably mounted shaft, a non-rotatable sleeve mounted on said shaft, and a combined hub and cylindrical member mounted on said shaft, said cylindrical member provided with a spirally extending slot, and a yielding connection between said combined hub and cylindrical member and said shaft, in combination with a gear pinion member loosely mounted on said sleeve and a projection on said gear member engaging with said spirally extending slot.

2. In an electric car starter, a rotatably mounted shaft, a non-rotatable sleeve mounted on said shaft, a combined hub and cylindrical member mounted on said shaft, said combined members provided with a spirally extending path, and a yielding connection between said combined hub and cylindrical member and said shaft, in combination with a gear pinion member loosely mounted on said sleeve, and a projection on said pinion member engaging with said spiral path.

3. In an electric car starter, a rotatably mounted shaft, a non-rotatable sleeve mounted on said shaft, a combined hub and cylindrical member mounted on said shaft, said combined hub and cylindrical member provided with a plurality of spirally extending paths, and a yielding connection between said combined member and said shaft, in combination with a gear pinion member loosely mounted on said sleeve, and a plurality of projections on said gear pinion member engaging with said spirally extending paths.

ODILON BRISBOIS.

Witnesses:
CHARLES TURNER BROWN,
BESS S. BROWN.